United States Patent
Yuri et al.

(10) Patent No.: US 6,176,096 B1
(45) Date of Patent: Jan. 23, 2001

(54) ABSORPTION TYPE REFRIGERATING APPARATUS

(75) Inventors: Nobuyuki Yuri; Hidetaka Kayanuma; Mitsuru Ishikawa; Toshimitsu Takaishi, all of Saitama (JP)

(73) Assignee: Honda Giken Kogyo Kabashika Kaisha, Tokyo (JP)

( * ) Notice: Under 35 U.S.C. 154(b), the term of this patent shall be extended for 0 days.

(21) Appl. No.: 09/362,662

(22) Filed: Jul. 29, 1999

(30) Foreign Application Priority Data

Aug. 3, 1998 (JP) .................................................. 10-218915

(51) Int. Cl.[7] ...................................................... F25B 15/00
(52) U.S. Cl. ................................................. 62/141; 62/476
(58) Field of Search ............................. 62/141, 148, 476, 62/495

(56) References Cited

U.S. PATENT DOCUMENTS

| 4,380,909 | * | 4/1983 | Sung | .......................................... | 62/79 |
| 5,490,393 | * | 2/1996 | Fuesting et al. | ........................ | 62/101 |
| 5,901,567 | * | 5/1999 | Suzuki et al. | ......................... | 62/324.2 |
| 5,927,086 | * | 7/1999 | Suzuki et al. | ........................... | 62/141 |
| 6,009,721 | * | 1/2000 | Fukuda et al. | .......................... | 62/476 |

* cited by examiner

Primary Examiner—William Doerrler
Assistant Examiner—Melvin Jones
(74) Attorney, Agent, or Firm—Armstrong, Westerman, Hattori, Mcleland, & Naughton

(57) ABSTRACT

The purity of a refrigerant liquid can be maintained to an appropriate level without being varied corresponding to a change in the atmospheric condition and the loading state. A portion of the refrigerant liquid in an evaporator is conveyed from the evaporator to the upper end of a rectifier where it is used as a vapor/liquid contact fluid. A temperature sensor T6 is provided at the upper end of the rectifier for detecting the temperature at the top of the rectifier or the temperature of the refrigerant vapor. The temperature and the purity of the refrigerant vapor are closely related to each other. The higher the temperature, the lower the purity is deteriorated. When the temperature T detected by the temperature sensor T6 is higher than a reference temperature level Tref, a flow control valve V5 is actuated to increase the flow of the refrigerant liquid to the rectifier. This recovers the purity of the refrigerant vapor, thus preventing declination of the purity of the refrigerant vapor in the evaporator.

5 Claims, 3 Drawing Sheets

ABSORPTION TYPE REFRIGERATING APPARATUS

BACKGROUND OF THE INVENTION

1. Field of the Invention

The present invention relates to an absorption type refrigerating apparatus and particularly to an absorption type refrigerating apparatus capable of maintaining the purity of a refrigerant liquid held in the evaporator to an appropriate level.

2. Description of the Related Art

In an absorption type refrigerating apparatus, the absorbent solution absorbs refrigerant vapor in the absorber thus being diluted. The diluted absorbent solution (diluted solution) is then conveyed to the regenerator where it releases the refrigerant and its concentration is increased. The absorbent solution at a higher concentration is returned back to the absorber. The refrigerant vapor extracted from the absorbent solution is condensed in the condenser and turned to a refrigerant liquid which is then conveyed to the evaporator. The refrigerant liquid conveyed to the evaporator is high in the purity but still contains a trace of the absorbent. The absorbent may be accumulated during a long-run of the operation and gradually decline the purity of the refrigerant liquid in the evaporator.

For avoiding declination of the purity of the refrigerant liquid, it is commonly practiced to withdraw a predetermined amount of the refrigerant liquid in the evaporator and convey it together with the diluted solution to the regenerator. In that case, the more the predetermined amount of the refrigerant liquid in the evaporator, the higher the purity of the refrigerant liquid is gained. However, increasing the predetermined amount of the refrigerant liquid to be withdrawn may lower the efficiency of the operation. As the refrigerant liquid accumulated by consumption of energy for the absorption has been added again to the absorbent solution, the loss of heat (particularly, latent heat) increases.

For minimizing the heat loss, it is proposed that the refrigerant liquid withdrawn from the evaporator is transferred to a rectifier involved in upper part of the regenerator where it is dropped down from the upper end to regain its purity. In that case, the refrigerant liquid is used as a vapor/liquid contact fluid required for the refining. This minimizes the heat loss and increases the efficiency of use of the refrigerant liquid as a primary agent for the absorption type refrigeration. Consequently, the thermal efficiency of the absorption type refrigerating system can be increased. The concentration of the absorbent solution may vary depending on the ambient conditions and the degree of load. Accordingly, if the supply of the refrigerant liquid as the vapor/liquid contact fluid is not properly controlled in response to a change in the concentration of the absorbent solution, the purity of the refrigerant vapor at the top of the rectifier will worsen. For overcoming this problem, it is known to detect the purity of the refrigerant liquid in the evaporator and adjust the supply of the vapor/liquid contact fluid. For example, when the boiling point of the refrigerant liquid in the evaporator is examined and its rise is detected, it is apparent that the purity of the refrigerant liquid worsens.

However, in assuming the deterioration of the purity of the refrigerant liquid from the rise of its boiling point, the supply of the vapor/liquid contact fluid is controlled only after deterioration of the purity of the refrigerant. This delay of action hardly ensures the accurate controlling over the supply. Also, the detection of the rise of the boiling point requires monitoring of both the temperature and the pressure in the evaporator, hence making the controlling procedure complex.

SUMMARY OF THE INVENTION

It is an object of the present invention to provide an absorption type refrigerating apparatus which has less delay of time during the controlling over the supply of a vapor/liquid contact fluid and can maintain the purity of a refrigerant liquid held in the evaporator to an appropriate level with a simple construction.

In an absorption type refrigerating apparatus according to the present invention comprising an evaporator for storing a refrigerant liquid, an absorber for storing an absorbent solution which includes an absorbent for absorbing a vapor of the refrigerant liquid generated in the evaporator, a regenerator for receiving and heating up a portion of the absorbent solution to extract the refrigerant vapor from the absorbent solution, a rectifier for rectifying the refrigerant vapor extracted in the regenerator, a condenser for condensing and feeding the refrigerant vapor rectified by the rectifier to the evaporator, a conduit for conveying a portion of the refrigerant vapor from the evaporator to the upper part of the rectifier for use as a vapor/liquid contact fluid in the rectifier, a temperature sensor for detecting the temperature of the refrigerant vapor rectified in the rectifier, a refrigerant liquid flow controlling means for increasing or decreasing the flow of the refrigerant liquid conveyed to the rectifier, and a controller responsive to a change in the temperature detected by the temperature sensor, which delivers a flow increase command to the refrigerant liquid flow controlling means when the temperature detected by the temperature sensor is higher than a reference temperature level and a flow decrease command to the refrigerant liquid flow controlling means when the temperature is not higher than the reference temperature level.

According to the above feature, the refrigerant with a higher purity to be conveyed to the rectifier can increase the purity of the refrigerant vapor to a higher level upon contacting with the refrigerant vapor. The refrigerant liquid flow controlling means is adapted for increasing or decreasing the supply of the refrigerant liquid to the rectifier in response to a change in the temperature at the top of the rectifier which is equal to the temperature of the refrigerant vapor. It is proved by the inventors through a series of experiments that the higher the temperature of the refrigerant vapor at the top of the rectifier, the more the purity of the refrigerant vapor is deteriorated. Referring to the result of the experiments, we, inventors, provide means for recovering and maintaining the purity of the refrigerant vapor to an appropriate level by increasing the supply of the refrigerant liquid from the evaporator when the temperature of the refrigerant vapor is higher.

DETAILED DESCRIPTION OF THE PREFERRED EMBODIMENTS

Figure 2:
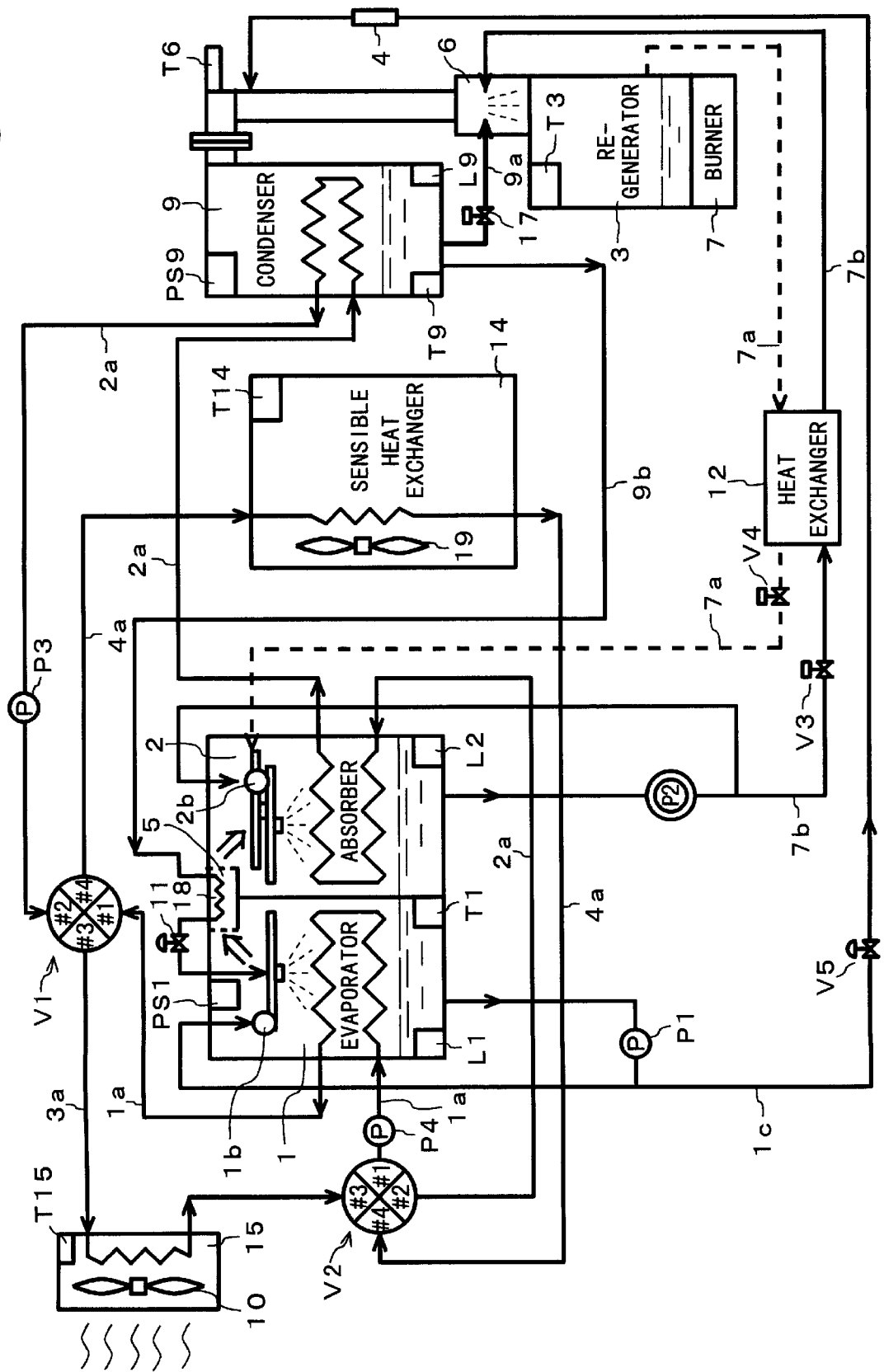
FIG. 2 is a circuitry block diagram of the air-conditioning system according to the embodiment of the present invention.

A preferred embodiment of the present invention will be described in more detail referring to the accompanying drawings. FIG. 2 is a block diagram showing a primary part of an absorption refrigerating/heating apparatus of the embodiment of the present invention. An evaporator 1 accommodates a refrigerant of fluoride alcohol, such as trifluoroethanol (TFE), while an absorber 2 accommodates a solution of DMI derivative, such as dimethyl-imidazolidinon, which contains an absorbent. The refrigerant is not limited to fluoride alcohol but may be an appropriate agent of which the nonfreezing range is wide. The solution is not limited either to the DMI derivative and it may be any other absorbent solution which is wide in the nonfreezing range, being higher than TFE in atmospheric temperature boiling point and having enough power to absorb TFE.

The evaporator 1 and the absorber 2 are fluidly communicated to each other by a (refrigerant) vapor passage 5. When the evaporator 1 is kept under a low pressure condition of e.g. 30 mmHg, the refrigerant is vaporized therein and moves via the vapor passage 5 into the absorber 2, as denoted by the double-line arrows. The refrigerant vapor is then absorbed by the absorbent in the absorber 2 thus causing an absorption freezing action.

A cooler 18 is provided for heating an d evaporating a remaining mist (of the refrigerant) in the refrigerant vapor and for decreasing the temperature of the refrigerant received from the condenser 9.

When a burner 7 is lit to heat up a regenerator 3 for increasing the concentration of the absorbent solution in the absorber 2, the absorbent absorbs the refrigerant vapor in the absorber 2 and the evaporation of the refrigerant in the evaporator 1 is accelerated hence cooling down the interior of the evaporator 1 with the latent heat of the refrigerant evaporation. The burner, the regenerator, and the concentration of the absorbent solution w ill be described later in more detail. A tube 1a for passing a chilled water is mounted to run through the evaporator 1 by using a pump P4. The tube 1a is connected at one end (the exit side in the embodiment shown) to the No. 1 opening of a first four-way valve V1 and at the other end (the entrance side in the embodiment) to the No. 1 opening of a second four-way valve V2. The refrigerant is fed by the action of a pump P1 to a spraying means 1b mounted in the evaporator 1 for being sprayed over the tube 1a in which the chilled water runs. The refrigerant deprives the chilled water in the tube 1a of heat and turns to a vapor which passes via the vapor passage 18 into the absorber 2. Consequently, the temperature of the chilled water is more declined.

The refrigerant in the evaporator 1 is driven by the pump P1 to the spraying means and, as will be described later, its portion is passed through the filter 4 and transferred to the rectifier 6 as a vapor/liquid contact fluid (referred to as a bleed hereinafter). A flow control valve V5 is provided between the evaporator 1 and the filter 4. The flow control valve V5 may be arranged with its opening switched between two, large and small, steps for varying the supply of the bleed. The chilled water running in the tube la may preferably be either an ethylene glycol or propylene glycol water solution.

As the refrigerant vapor is absorbed by the solution in the absorber 2, the absorption heat increases the temperature of the solution. The lower the temperature and the higher the concentration of the solution, the greater the absorbing capability of the solution will be. For attenuating the temperature increase of the solution, a tube 2a is provided in the absorber 2 for passing a flow of cooling water. The tube 2a is connected at one end (the exit side in the embodiment shown) via a condenser 9 and a pump P3 to the No.2 opening of the first four-way valve V1 and at the other end (the entrance side) to the No. 2 opening of the second four-way valve V2. Preferably, the cooling water running along the tube 2a is the same as the chilled water which runs across the tube 1a in properties or constitution.

The absorbent solution is fed by the action of the pump P2 to a spraying means 2b mounted in the absorber 2 for being sprayed over the tube 2a. Consequently, the solution is cooled down by the cooling water running along the tube 2a. Simultaneously, the cooling water deprives the solution of heat and its temperature will increase. As the solution in the absorber 2 has absorbed the refrigerant vapor, the concentration of the absorbent drops thus lowering the absorbing capability of the solution.

The diluted solution which has absorbed the refrigerant vapor in the absorber 2 is passed via a tube 7b and a control valve V3 to the rectifier 6 and the regenerator 3 by the pump P2. The regenerator 3 is provided with the burner 7 for heating up the diluted solution. The burner 7 may be a gas burner or any other heating means. The solution is heated by the burner 7 and the concentration of the absorbent is increased as the refrigerant vapor is separated. The resultant (concentrated) solution is returned via a tube 7a and a control valve V4 to the absorber 2 where it is sprayed over the tube 2a by the spraying means 2b and pump P2.

The refrigerant vapor generated in the regenerator 3, when passing upward in the rectifier 6, comes in direct contact with the absorbent solution falling down therein and can thus release a remaining small amount of the absorbent solution before it passes to the condenser 9.

The refrigerant vapor is cooled down and liquefied by the condenser 9. The refrigerant in a liquid form is then passed through a tube 9b, a cooler 18, and a reducing valve (flow valve) 11 and returned back to the evaporator 1 for spraying from the spraying means 1b. The cooler 18 is a type of heat exchanger which heats up a mist of the refrigerant in the vapor from the evaporator 1 with the higher temperature refrigerant from the condenser 9 for accelerating the evaporation of the refrigerant mist and, on the other hand, cooling down the relatively higher temperature refrigerant which is then fed back to the evaporator 1.

Although the purity of the refrigerant fed back from the condenser 9 is fairly high in the evaporator 1, it may or must gradually be declined because a very small amount of the absorbent in the circulated vapor is accumulated during a long period of the cycle operation. For recovering the purity of the refrigerant, a small portion of the refrigerant from the evaporator 1 is sent through the valve 5 and the filter 4 to the rectifier 6 where it is mixed with the refrigerant vapor from the regenerator 3. The filter 4 is used for preventing filler tubes of the rectifier 6 from being fouled with dirt and/or rust in the absorbent solution which may cause degradation of the functional operation.

A heat exchanger 12 is provided in the middle way of the tubes 7a and 7b which respectively connect the absorber 2 and the rectifier 6. The absorbent solution at high concentration and high temperature which runs along the tube 7a from the regenerator 3 is subjected to a heat exchanging action in the heat exchanger 12 with the diluted solution which runs along the tube 7b from the absorber 2, hence being cooled before it is fed to the absorber 2 where it is sprayed. In reverse, the diluted solution is preheated by the action of the heat exchanger 12 and passed to the rectifier 6. This will surely improve the thermal efficiency in the apparatus. In addition, another heat exchanger (not shown)

may be provided for transferring heat from the concentrated solution to the cooling water which runs along the tube 2a from the absorber 2 or the condenser 9. Accordingly, the temperature of the concentrated solution returned to the absorber 2 will be reduced further while the temperature of the cooling water will be increased.

A sensible heat exchanger 14 is also provided with a tube 4a for heat exchange between the cooling water or the chilled water and the outside air and an indoor unit 15 is provided with a tube 3a. The tubes 3a and 4a are connected at one end (the entrance side in the embodiment shown) to the No. 3 and No. 4 openings of the first four-way valve V1, respectively, and at the other end (the exit side) to the No. 3 and No. 4 openings of the second four-way valve V2, respectively. The indoor unit 15 is located in a room to be cooled or heated and includes a fan 10 used in common for blowing out either cooling air and heating air from its blowing window (not shown). The sensible heat exchanger 14 is normally placed in the outdoor and includes a fan 19 for forcedly exchanging of heat with the outside air.

The evaporator 1 is provided with a level sensor L1 for detecting the amount of the refrigerant and a temperature sensor T1 for detecting the temperature of the refrigerant. The absorber 2 is equipped with a level sensor L2 for detecting the amount of the solution. The condenser 9 is provided with a level sensor L9 for detecting the amount of condensed refrigerant, a temperature sensor T9 for detecting the temperature of the refrigerant, and a pressure sensor PS9 for detecting the pressure in the condenser 9.

The sensible heat exchanger 14 is provided with a temperature sensor T14 for detecting the temperature of the outside air, the indoor unit 15 is provided with a temperature sensor T15 for detecting the temperature of a room which is air-conditioned, and the regenerator 3 is provided with a temperature sensor T3 for detecting the temperature of the solution. A temperature sensor T6 for detecting an atmosphere temperature or the temperature of refrigerant vapor rectified by the rectifier 6 is provided at the top of the rectifier 6.

In the cooling operation, the first and the second four-directional valves V1 and V2 are actuated so that their No. 1 and No. 2 openings communicate with the No. 3 and No. 4 openings respectively. This allows the chilled water cooled down by spraying the refrigerant over the conduit 1a to run into the conduit 3a of the indoor unit 15 for cooling the room.

In the heating operation, the first four-directional valve V1 and the second four-directional valve V2 are switched so that their No. 1 and No. 2 openings communicate with the No. 4 and No. 3 openings respectively. This allows the cooling water heated up in the conduit 2a to be driven by the pump P3 into the conduit 3a of the indoor unit 15 for heating the room.

When the temperature of the outside air drops down to an extreme level during the heating operation, pumping the heat from the outside air by the sensitive heat exchanger 14 becomes difficult hence declining the heating capability. For compensation, a return passage 9a and an open/close valve 17 are provided in a combination for bypassing between the condenser 9 and the regenerator 3 (or the rectifier 6). As the pumping of the heat from the outside air has become hard, the absorption and refrigeration cycle is ceased and the vapor generated by the regenerator 3 is circulated to and from the condenser 9. In the condenser 9, the heat produced with the burner 7 is efficiently transferred by the direct heat-up operation to the cooling water in the conduit 2a, thus improving the heating capability.

The control of the bleed conveyed from the evaporator 1 to the rectifier 6 is now explained. The concentration of the diluted liquid supplied from the absorber 2 to the regenerator 3 is varied depending on the ambient conditions and the loads exerted on. Accordingly, for maintaining the purity of the refrigerant vapor to an appropriate level at the top of the rectifier 6, it is necessary to adjust the supply of the bleed to the rectifier 6 in response to a change in the diluted solution.

Examining the relation between the diluted solution and the purity of the refrigerant vapor at the top of the rectifier 6 and between the diluted solution and the temperature of the refrigerant vapor at the top of the rectifier 6, we, the inventors, proved through a series of experiments that the temperature and the purity of the refrigerant vapor are very closely related to each other. More specifically, the lower the purity of the refrigerant vapor, the higher the temperature of the refrigerant vapor was increased. In the embodiment, the temperature sensor T6 is used for detecting the temperature of the refrigerant vapor and when the temperature is higher than a reference degree, the supply of the bleed is increased.

Figure 3:
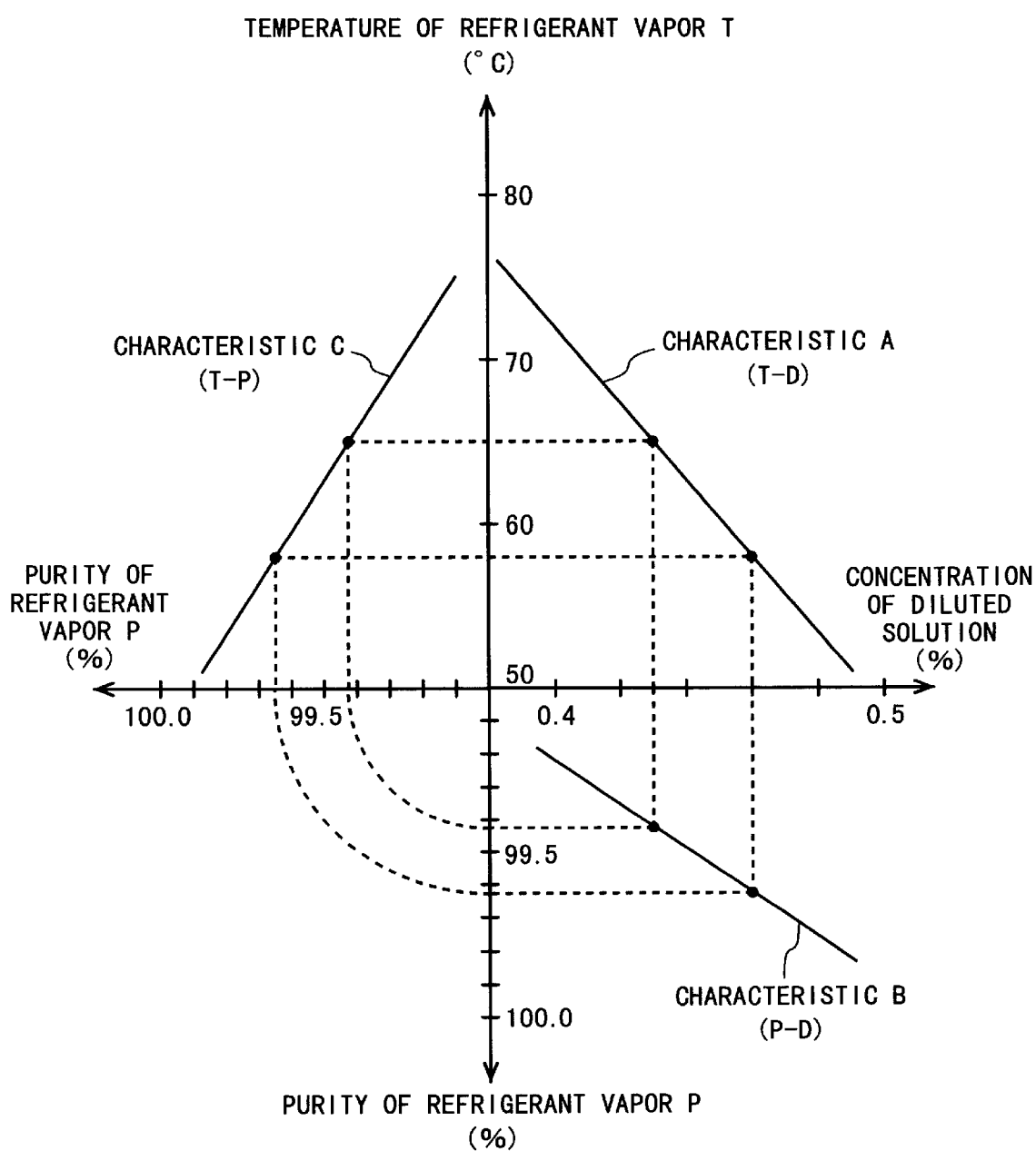
FIG. 3 is a diagram showing the relationship between the temperature and the purity of a refrigerant vapor at the top of a rectifier.

The result of experimental measurements on the relationship between the temperature and the purity of the refrigerant vapor is first explained. FIG. 3 is a diagram showing the relationship between the temperature T and the purity P of the refrigerant vapor and the concentration D of the diluted solution which all are measured at the top of the rectifier 6, where the supply of the diluted solution to the regenerator 3 and the supply of the bleed to the rectifier 6 were constant. As shown, the concentration D of the diluted solution is a degree of density of the refrigerant in the solution. The characteristic profile A indicates the relation between the temperature T of the refrigerant vapor and the concentration D of the diluted solution and the characteristic profile B indicates the relation between the purity P of the refrigerant vapor and the concentration D of the diluted solution. Also, shown is the profile C representing the relation between the temperature and the purity of the refrigerant vapor calculated from the characteristic profiles A and B.

The profile A indicates that the higher the concentration D of the refrigerant in the diluted solution, the more the purity P of the refrigerant vapor is deteriorated. The profile B shows that the higher the concentration of the diluted solution, the higher the purity P of the refrigerant vapor is increased. The characteristic profile C determined from the two profiles A and B indicates that the lower the purity P of the refrigerant vapor, the higher the temperature T of the refrigerant vapor is increased.

Figure 1:
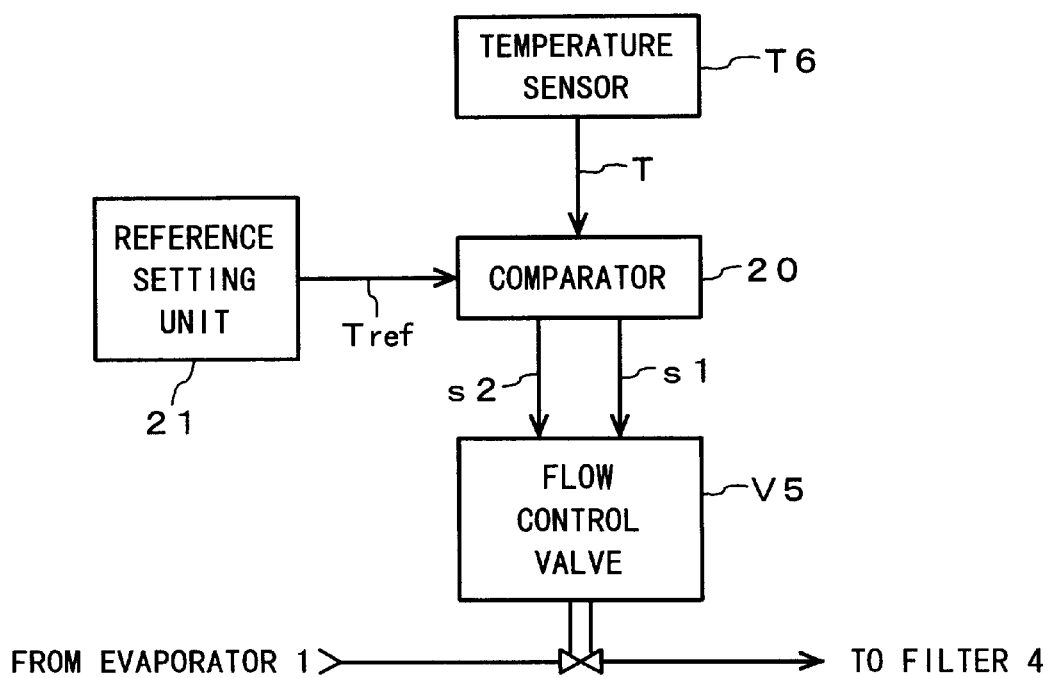
FIG. 1 is a functional block diagram of a feature of an air-conditioning system showing an embodiment of the present invention.

The supply of the bleed is controlled with the above result. FIG. 1 is a block diagram illustrating a feature of a controller for controlling the supply of the bleed. In the figure, a comparator 20 and a reference setting unit 21 can be implemented by a microcomputer. The temperature sensor T6 is mounted at the top of the rectifier 6 and its detecting measurement T representing the temperature of the refrigerant vapor at the top of the rectifier 6 is given to the comparator 20. The reference setting unit 21 contains a reference value Tref used for determination by which the supply of the bleed is switched to a large level or a small level. The reference value Tref has a dead zone. Upon receiving the reference value Tref, the comparator 20 examines whether the temperature T of the refrigerant vapor is higher or lower than the reference value Tref.

When the temperature T of the refrigerant vapor is higher than the reference value Tref, a switch signal s1 is fed to the flow control valve V5. When the temperature is not higher than the reference valve Tref, a switch signal s2 is given to the same. The flow control valve V5 sets its opening to a large flow mode responding to the switch signal s1 and to a small flow mode responding to the switch signal s2. In other words, when the temperature of the refrigerant vapor is higher than the reference value Tref, the supply of the bleed is increased. When the temperature T of the refrigerant vapor is not higher than the reference value Tref, the supply of the bleed is decreased. Accordingly, the purity of the refrigerant vapor can be maintained to an appropriate level by controlling the supply of the bleed in response to the temperature T of the refrigerant vapor.

It is understood that the flow control valve V5 is not limited to such a two-step control type as switching between two different flows but of a three or more step control type or a continuously flow adjusting type will be used with equal success. Also, the flow of the refrigerant liquid may be controlled by not only the opening of the valve but also the revolution of the pump P1 for pumping the refrigerant from the evaporator 1. In the latter case, the flow control valve is replaced with an orifice. Moreover, the temperature T of the refrigerant vapor may be detected not at the top of the rectifier 6 but in the conduit located midway between the rectifier 6 and the condenser 9. This also calculates the relationship between the temperature T and the purity P of the refrigerant vapor and can hence control the supply of the bleed.

According to the present invention, the flow of the bleed or the refrigerant liquid supplied to the rectifier is controlled in response to the temperature measured at the top of the rectifier. Therefore, the action of maintaining the purity of the refrigerant liquid to an appropriate level can be performed at a higher response speed than that in the manner of controlling the flow of the bleed from detecting the purity of the refrigerant in the evaporator. Since the purity of the refrigerant vapor is identified from the measurements of the temperature sensors, the overall controlling action will be simplified.

What is claimed is:

1. An absorption type refrigerating apparatus comprising:

an evaporator for storing a refrigerant liquid;

an absorber for storing an absorbent solution which includes an absorbent for absorbing a vapor of the refrigerant liquid generated in the evaporator;

a regenerator for receiving and heating up a portion of the absorbent solution to extract the refrigerant vapor from the absorbent solution;

a rectifier for rectifying the refrigerant vapor extracted in the regenerator;

a condenser for condensing and feeding the refrigerant vapor rectified by the rectifier to the evaporator;

a conduit for conveying a portion of the refrigerant vapor from the evaporator to the upper part of the rectifier for use as a vapor/liquid contact fluid in the rectifier;

a temperature sensor for detecting the temperature of the refrigerant vapor rectified in the rectifier;

a refrigerant liquid flow controlling means for increasing or decreasing the flow of the refrigerant liquid conveyed to the rectifier; and a controller responsive to a change in the temperature detected by the temperature sensor, which delivers a flow increase command to the refrigerant liquid flow controlling means when the temperature detected by the temperature sensor is higher than a reference temperature level and a flow decrease command to the refrigerant liquid flow controlling means when the temperature is not higher than the reference temperature level.

2. An absorption type refrigerating apparatus according to claim 1, wherein the increase or decrease of the flow with the refrigerant liquid flow controlling means is implemented by controlling the revolution of a pump provided for pumping up the refrigerant liquid from the evaporator to the rectifier.

3. An absorption type refrigerant apparatus according to claim 1, wherein the increase or decrease of the flow with the refrigerant liquid flow controlling means is implemented by controlling the action of a flow control valve provided across the conduit disposed for conveying the refrigerant liquid from the evaporator to the rectifier.

4. An absorption type refrigerant apparatus according to claim 1, wherein the temperature sensor is mounted to the upper end of the rectifier for detecting the temperature of the internal atmosphere.

5. An absorption type refrigerant apparatus according to claim 1, wherein the temperature sensor is mounted between the rectifier and the condenser for detecting the temperature of the internal atmosphere.

\* \* \* \* \*